United States Patent [19]

Yap et al.

[11] Patent Number: 5,573,586
[45] Date of Patent: Nov. 12, 1996

[54] ASBESTOS-FREE, ASPHALT ROOFING COMPOSITIONS ESPECIALLY ADAPTED FOR COLD APPLICATIONS

[75] Inventors: Michael L. Yap, Oldsmar; Raymond T. Hyer; Barton J. Malina, both of Tampa, all of Fla.

[73] Assignee: Gardner Asphalt Corporation, Tampa, Fla.

[21] Appl. No.: 588,879

[22] Filed: Jan. 19, 1996

[51] Int. Cl.⁶ .............................. C08L 95/00; C04B 7/12; C04B 24/36; C09D 195/00
[52] U.S. Cl. ................ 106/668; 106/278; 106/281.1; 106/282; 106/671; 106/708; 106/823; 106/DIG. 1; 106/DIG. 7
[58] Field of Search ........................ 106/668, 278, 106/281.1, 282, 671, 708, 823, DIG. 1, DIG. 7

[56] References Cited

U.S. PATENT DOCUMENTS

| | | | |
|---|---|---|---|
| 3,585,155 | 6/1971 | Hollstein | 106/281.1 |
| 4,168,178 | 9/1979 | Hesseler | 106/284.05 |
| 4,168,179 | 9/1979 | Hesseler | 106/282 |
| 4,244,740 | 1/1981 | Harris | 106/282 |
| 4,405,680 | 9/1983 | Hansen | 428/285 |
| 4,745,032 | 5/1988 | Morrison | 106/DIG. 1 |
| 5,236,497 | 8/1993 | Grzybowski | 106/282 |
| 5,340,391 | 8/1994 | Grzybowski | 106/282 |
| 5,391,417 | 2/1995 | Pike | 106/705 |

FOREIGN PATENT DOCUMENTS

| | | | |
|---|---|---|---|
| 51-020222 | 2/1976 | Japan | 106/668 |
| 92/15645 | 9/1992 | WIPO | 106/282 |

OTHER PUBLICATIONS

Chemical Abstract No. 122:140829 which is an abstract of of Polish Pat. No. 159521, 31 Dec. 1992.

*Primary Examiner*—Anthony Green
*Attorney, Agent, or Firm*—Dominik & Stein

[57] ABSTRACT

Asbestos-free asphalt cold application roofing compositions are made available through the controlled utilization of fly ash.

3 Claims, No Drawings

ASBESTOS-FREE, ASPHALT ROOFING COMPOSITIONS ESPECIALLY ADAPTED FOR COLD APPLICATIONS

FIELD OF THE INVENTION

This invention relates to asbestos-free cold application asphalt compositions containing controlled fly ash components to provide requisite formulation and application properties.

BACKGROUND OF THE INVENTION

For many years asbestos has been used to impart texture, strength, and thixotropic properties to asphalt compositions. However, because indications are that asbestos is both toxic and carcinogenic many such products have fallen out of favor.

The search for improved cold-applied asphalt compositions where the asbestos used may be minimized or replaced entirely without a decrease in performance has been an on-going concern in the art. In conjunction with a non-asbestos fiber, asbestos may be replaced by a gelling clay, either alone or with a surfactant, to gel and thicken the asphalt. The use of surfactant however, introduces additional costs.

Many of these formulations have associated with them a number of significant problems and deficiencies. Most are related to inefficient formulation procedures and inadequate compositions performance, and result from the asphalt, filler, and other components currently used. Basically, required product viscosity is difficult to achieve initially and control because it "drifts" with time, and varies due to the fact that characteristics of raw materials change from load to load. Thus, excessive manufacturing time and unacceptable deviation from an acceptable norm on the finished product is encountered.

PRIOR ART

U.S. Pat. Nos. 3,585,155; 4,405,680; 4,745,032 disclose asphalt, fly ash mixtures. U.S. Pat. No. 5,391,417 discloses fly ash in various asphaltic compositions. None disclose the compositions of this invention.

SUMMARY OF THE INVENTION

It has now surprisingly been found that the controlled use of fly ash can provide asbestos-free asphalt roofing compositions. This is accomplished by utilizing the fly ash properties and amounts so as to gel the asphalt cutback composition without use of extraneous agents. It is indeed surprising that controlled use of the readily-available material, fly ash, can be utilized to overcome the old and well-known disabilities of asbestos formulations. Compositions of this invention thus consist essentially of cutback asphalt; fly ash; non-asbestos, inert, fiber; and water.

DETAILED DESCRIPTION OF THE INVENTION

The asphalt employed in this invention can be any of the well known bituminous substances derived from a number of materials such as, for example, petroleum, shale oil, gilsonite and the like. Asphalt is a thick, viscous mixture of compounds such as, for example, paraffinic, cycloaliphatic and aromatic hydrocarbons and lesser amounts of heterocyclic compounds containing sulfur, nitrogen or oxygen. Although asphalt can be obtained from natural sources it is primarily derived as the residue of petroleum distillation (e.g. the bottom product of a vacuum distillation of a topped crude). Although this invention is not limited thereto, it is presently preferred that the asphalt have a penetration (ASTM D5) at 77 degrees F. dmm: ranging from about 5 to about 300 dmm and more preferably from about 50 to about 200 dmm and conform in general to specifications outlined by ASTM D312, D946 and/or D449. The asphalt is present as an asphalt cutback having (1) about 50–85 parts by weight asphalt, and (2) about 15–50 parts by weight solvent. Preferably, the solvent is selected from the group consisting of petroleum distillates and mixtures thereof.

Fly ash is a very fine-grained residue that is obtained from the combustion of predominantly coal dust and or other natural sources. It accumulates in the electrical or mechanical dust collecting system which is connected to the steam generator of power plants.

There are two classes of fly ash C, and F, that reflect some differences in composition, see ACI Material Journal, September/October 1987, pages 384–385. The particle size is in the range of about 5–80 microns.

The fly ash is utilized to impart a viscosity in the range of about 5,000 to 2,000,000 centipoise. Accordingly, while class F fly ash is preferred, class C can be employed in part. The fly ash in that case utilized is thus predominantly class F, i.e. at least about 50 wt. % of the total fly ash. Combustion products of various organic materials could be selected to provide similar characteristics in the fly ash.

The non-asbestos inert fibers utilized are well known in the trade, e.g. fiberglass, wood, mineral cellulosics, plastic fibers, etc.

Subject to the foregoing, the ranges of components are about:

| Parts By Weight % (Based on Total Composition) | |
| --- | --- |
| Cutback asphalt (asphalt solvent) | 20–80 |
| Fly Ash | 5–60 |
| Non-Asbestos Inert Fiber | 0.5–10 |
| Water | 0.5–15 |

The preferred formulation is:

| Parts By Weight % (Based on Total Composition) | |
| --- | --- |
| Cutback asphalt | 60–80 |
| Fly Ash | 10–35 |
| Non-Asbestos Inert Fiber | 3–5 |
| Water | 2–4 |

Additives can be added for custom attributes.

The preferred method of formulation is admixture in conventional mixing equipment utilizing first the cutback asphalt, followed by the fly ash, fiber, and water. The temperature utilized is from ambient to about 210 degrees Fahrenheit. The product is removed when the desired viscosity is obtained.

The method of application to the roof is well known and need not be elaborated here.

This invention will be readily understood by reference to the following examples.

EXAMPLE 1

An asbestos-free roofing composition for cold application was prepared consisting of fly ash, cutback asphalt, non-asbestos fiber, and water. The preferred composition which consists of cutback asphalt, non-asbestos fiber, fly ash class "F" and water, showed a very consistent viscosity, excellent shelf life, a non-settling product and passed the behavior test at 140 degrees Fahrenheit requirement as outlined by ASTM D28922-91,ASTM D4586-93, ASTM D2823-90, and ASTM D4479-93.

The composition was:

|  | Parts By Weight % |
| --- | --- |
| Cutback Asphalt | 61.0 |
| Fly Ash Class "F" | 31.6 |
| Non-Asbestos Fiber | 4.4 |
| Water | 3.0 |
| Total | 100.0 |

EXAMPLE 2

An asbestos-free roofing composition for cold application consisting of: fly ash, cutback asphalt, non-asbestos fiber, and water, whereby fly ash Class "C" was utilized rather than Class "F". The composition showed inconsistent viscosity, variable shelf life, product separation, and failed behavior test at 140 degrees Fahrenheit requirement as outlined by ASTM D2822-91, ASTM D48586-93, ASTM D2823-90, and ASTM D4479-93.

The composition was:

|  | Parts By Weight % |
| --- | --- |
| Cutback Asphalt | 61.0 |
| Fly Ash Class "C" | 31.6 |
| Non-Asbestos Fiber | 4.4 |
| Water | 3.0 |
| Total | 100.0 |

EXAMPLE 3

An asbestos-free roofing composition for cold application consisting of fly ash, cutback asphalt, non-asbestos fiber, and water, whereby fly ash Class "C" was partially utilized in conjunction with fly ash Class "F" in the composition showed that the finished product had similar characteristics as example 1.

The composition was:

|  | Parts By Weight % |
| --- | --- |
| Cutback Asphalt | 61.0 |
| Fly Ash Class "C" | 4.7 |
| Fly Ash Class "F" | 26.9 |
| Non-Asbestos Fiber | 4.4 |
| Water | 3.0 |
| Total | 100.0 |

The advantages of this invention will be apparent to the skilled in the art. Environmental concerns from asbestos are eliminated. Economical formulations are provided with cost advantages over other proposed materials. Cost savings are realized in handling and shipping. The ultimate compositions are of superior weathering and durability. Other advantages are longevity, durability, enhanced flexibility, high insulation, good ultra violet absorption, ease of application, non-settling, improved flow properties, lightweight, rust inhibition, water repellency, elimination of need for extraneous filler, enhanced adhesion, and use of recyclable waste products.

It is to be understood that this invention is not limited to the specific examples which have been offered as particular embodiments and that modifications can be made without departing from the spirit thereof.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. An asbestos-free roofing composition adapted for cold application consisting essentially of: cutback asphalt, the asphalt having a penetration, according to ASTM D5, at 77 degrees F° dmm: ranging from about 5 to about 300 dmm; non-asbestos inert fiber; water, and fly ash, having a particle size in the range of about 5–80 microns to impart a viscosity in the range of about 5,000 to 2,000,000 centipoise, the parts by weight of the components being about:

|  | Parts By Weight % (Based On Total Composition) |
| --- | --- |
| cut back asphalt | 20–80 |
| fly ash | 5–60 |
| non-asbestos inert fiber | 0.5–10 |
| water | 0.5–15. |

2. The composition of claim 1 in which the fly ash is at least 50 wt.% class F.

3. The composition of claim 1 in which the parts by weight of the components are about:

|  | Parts By Weight % (Based On Total Composition) |
| --- | --- |
| cut back asphalt | 60–80 |
| fly ash | 10–35 |
| non-asbestos inert fiber | 3–5 |
| water | 2–4. |

* * * * *